United States Patent
Eduri et al.

(10) Patent No.: US 7,167,908 B2
(45) Date of Patent: Jan. 23, 2007

(54) FACILITATING OPERATION OF A MULTI-PROCESSOR SYSTEM VIA A RESOLVED SYMBOLIC CONSTANT

(75) Inventors: Eswar M. Eduri, Santa Clara, CA (US); Uday R. Naik, Fremont, CA (US); Lawrence B. Huston, III, Wexford, PA (US)

(73) Assignee: Intel Corporation, Santa Clara, CA (US)

( * ) Notice: Subject to any disclaimer, the term of this patent is extended or adjusted under 35 U.S.C. 154(b) by 852 days.

(21) Appl. No.: 10/256,300

(22) Filed: Sep. 27, 2002

(65) Prior Publication Data

US 2004/0073633 A1    Apr. 15, 2004

(51) Int. Cl.
*G06F 15/177* (2006.01)

(52) U.S. Cl. .................................... 709/220
(58) Field of Classification Search ............... None
See application file for complete search history.

(56) References Cited

U.S. PATENT DOCUMENTS

| | | | |
|---|---|---|---|
| 5,287,511 A * | 2/1994 | Robinson et al. ........... 717/106 |
| 5,909,559 A * | 6/1999 | So ............................ 710/307 |
| 6,075,935 A * | 6/2000 | Ussery et al. ................ 716/17 |
| 6,179,489 B1 * | 1/2001 | So et al. ..................... 718/102 |
| 6,298,370 B1 * | 10/2001 | Tang et al. .................. 718/102 |
| 6,687,818 B1 * | 2/2004 | Svenkeson et al. ............ 713/2 |
| 6,697,898 B1 * | 2/2004 | Shishizuka et al. ......... 710/107 |
| 6,760,903 B1 * | 7/2004 | Morshed et al. ............ 717/130 |
| 6,792,452 B1 * | 9/2004 | Philyaw ..................... 709/217 |
| 6,822,959 B2 * | 11/2004 | Galbi et al. ................. 370/392 |
| 6,839,808 B2 * | 1/2005 | Gruner et al. .............. 711/130 |
| 6,842,857 B2 * | 1/2005 | Lee et al. ..................... 713/2 |
| 6,880,155 B2 * | 4/2005 | Schwabe et al. ............ 717/162 |
| 6,895,477 B2 * | 5/2005 | Hass et al. .................. 711/146 |
| 6,901,488 B2 * | 5/2005 | Gruner et al. .............. 711/154 |
| 6,920,542 B2 * | 7/2005 | Gruner et al. .............. 711/203 |

\* cited by examiner

*Primary Examiner*—John B. Walsh
(74) *Attorney, Agent, or Firm*—Buckley, Maschoff & Talwalkar LLC

(57) ABSTRACT

According to some embodiments, operation of a multi-processor system is facilitated via a resolved symbolic constant. For example, configuration information may be determined at a management processor of a multi-processor network router adapted to receive and transmit network packets. A symbolic constant may be resolved at the management processor in a standard program based on the configuration information. It may then be arranged for another processor of the multi-processor network router to execute an executable version of the standard program in accordance with the resolved symbolic constant.

21 Claims, 5 Drawing Sheets

FACILITATING OPERATION OF A MULTI-PROCESSOR SYSTEM VIA A RESOLVED SYMBOLIC CONSTANT

BACKGROUND

In a multi-processor system, programs that execute on different processors may need to process information in a cooperative manner. For example, different processors may need to agree on a memory location at which a data structure is stored (e.g., so that information can be properly stored and/or retrieved by each processor). Similarly, different processors may need to agree on a global state that describes how data should be processed.

One approach to ensure that programs executing on different processors will process information in a cooperative manner is to use compile-time constants to define certain values. For example, a compile-time constant in a program executing on one processor might be used to define a memory location at which a data structure is stored. The same compile-time constant can then be used in a program executing on another processor to ensure that both programs will properly use the data structure to store and/or retrieve information. One disadvantage to such an approach, however, is that the programs may need to be re-compiled (and re-linked) when the configuration of the multi-processor system is modified (e.g., in a way that changes the memory location at which the data structure is stored). Such an inflexible approach may not be practical, especially if the configuration of the multi-processor system is frequently modified.

As another approach, certain values could be stored at pre-determined memory locations. For example, a pre-determined memory location might always contain a value (i.e., a pointer) that defines where a data structure is stored. Having each processor access the pre-determined memory location in order to determine the value, however, may not be efficient (e.g., the time required to access the pre-determined memory location could degrade the performance of the multi-processor system). Moreover, such an approach might require that the values be stored in registers, which may waste a limited resource.

DETAILED DESCRIPTION

Figure 1:
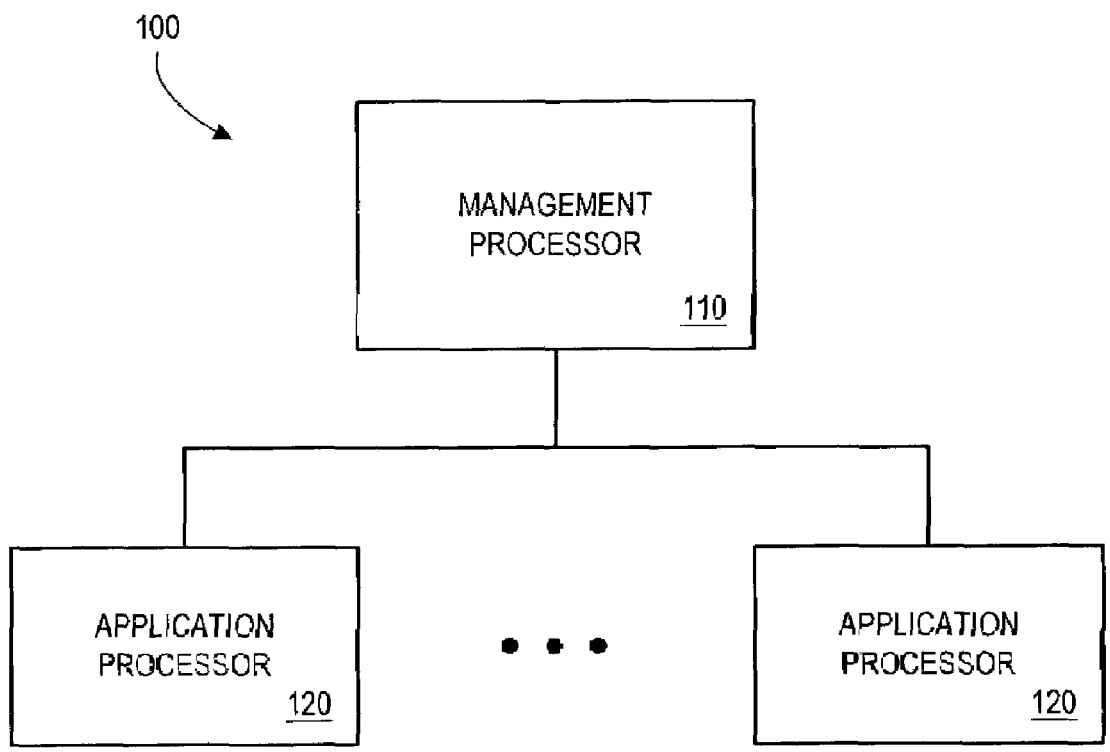
FIG. 1 is a block diagram of a multi-processor system according to some embodiments.

FIG. 1 is a block diagram of a multi-processor system 100 according to some embodiments. In particular, the system 100 includes a management processor 110 and a number of application processors 120. Note that any number of application processors 120 might be included in the system 100 (including only a single application processor 120).

The management processor 110 may, for example, provide control and management of an application while the application processors 120 cooperatively perform application processing. According to some embodiments, the management processor 110 comprises a master processor and the application processors 120 comprise slave processors.

According to some embodiments, the management processor 110 uses a symbolic constant that is set when an application is loaded. For example, the management processor 110 may start before the application processors 120 and then determine configuration information (e.g., a location where a data structure is stored or a global state that describes how data will be processed).

Based on the configuration information, the management processor 110 may define appropriate values for the symbolic constant. Note that the symbolic constant may have a first value defined for a first application processor 120 and a second value defined for a second application processor 120. That is, different versions of executable code may be created for different application processors 120.

The management processor 110 may then start the application processors 120. Each application processor 120 can then load the appropriate executable code, which has already had the symbolic constant resolved (by the management processor 110), execute the code, and process information in a cooperative manner. Note that the application processors 120 may run as if the symbolic constants were compile-time constants (even though the values were set at run time).

Multi-Processor Methods

Figure 2:
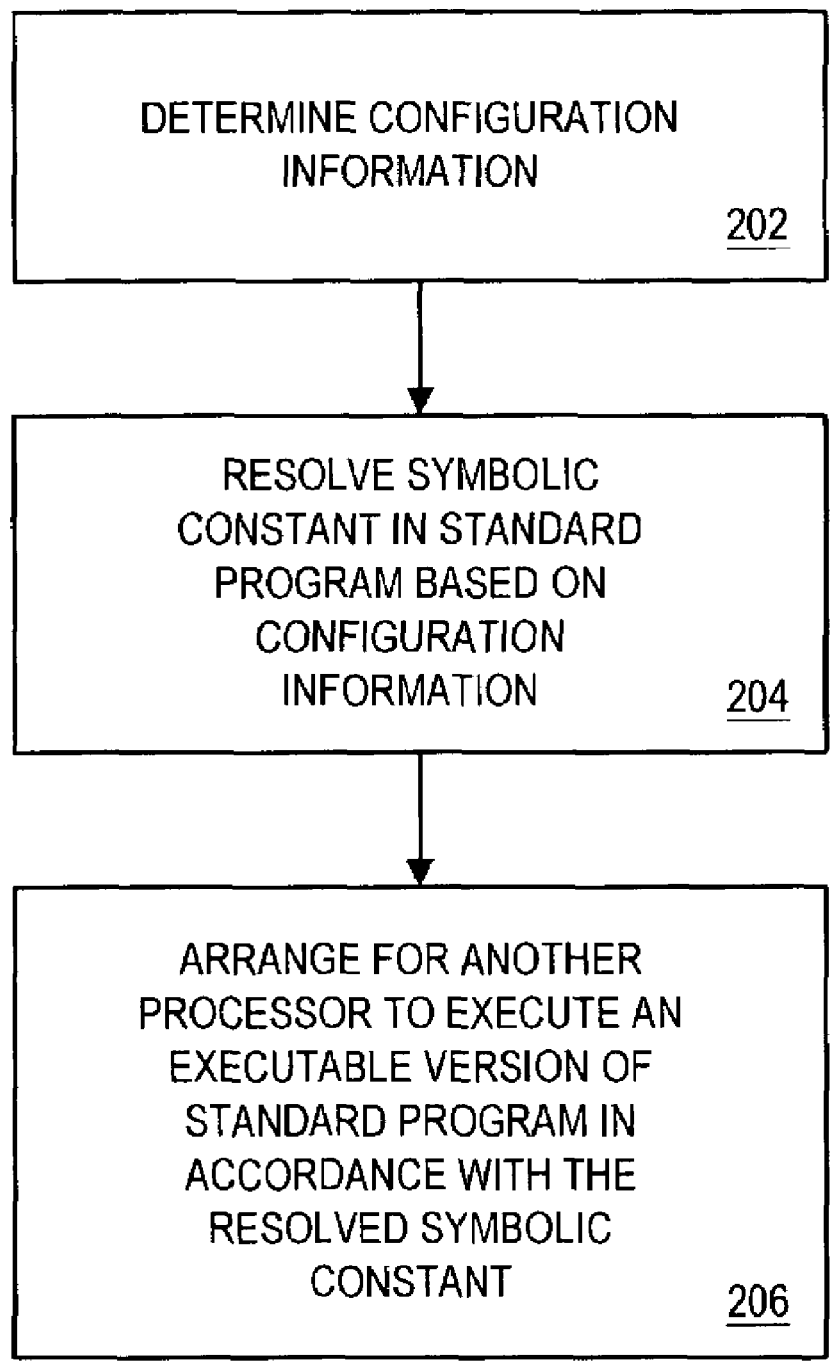
FIG. 2 is a flow chart of a method that may be performed by a management processor according to some embodiments.

FIG. 2 is a flow chart of a method that may be performed by the management processor 110 according to some embodiments. The flow charts described herein do not necessarily imply a fixed order to the actions, and embodiments may be practiced in any order that is practicable.

At 202, configuration information is determined. For example, the management processor 110 may determine the configuration information (e.g., a relevant state) during an initialization process before the application processors 120 start. According to some embodiments, the configuration information is determined in accordance with information defined by a user (e.g., an administrator associated with a multi-processor system).

At 204, a symbolic constant (e.g., a constant that is set when an application is loaded) in a "standard" program is resolved based on the configuration information. As used herein, the term "standard" may indicate that the same program (or portion of the program) is used with respect to different application processors 120. Moreover, the term "standard" may instead indicate that the same program (or portion of the program) is used with respect to the same application processor 120 at different times (e.g., different times associated with different system configurations). Note that any number of symbolic constants may be resolved by the management processor 110.

At 206, it is arranged for another processor to execute an executable version of the standard program in accordance with the resolved symbolic constant. For example, the management processor 110 may arrange for each of the application processors 120 to start and to load an appropriate executable version of the standard code. The application processors 120 may then execute the executable code and process information cooperatively.

Note that the management processor 110 might resolve a symbolic constant to a first value for a first application processor 120 and to a second value for a second application processor 120. In this case, the management processor 110 may arrange for the first application processor 120 to execute a first executable version of the standard program in accordance with the first value and for the second application processor 120 to execute a second executable version of the standard program in accordance with the second value (note that the first and second values might be the same).

Figure 3:
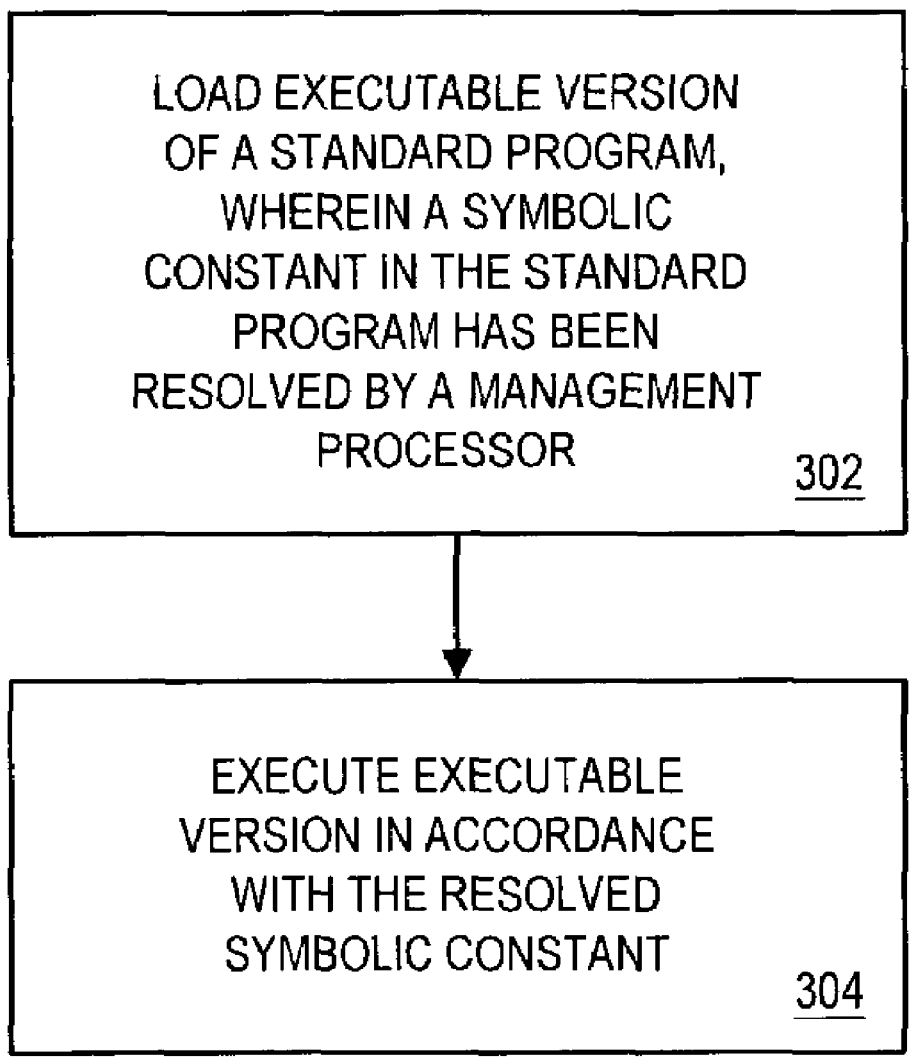
FIG. 3 is a flow chart of a method that may be performed by an application processor according to some embodiments.

FIG. 3 is a flow chart of a method that may be performed by an application processor 120 according to some embodiments. At 302, an executable version of a standard program is loaded, wherein a symbolic constant in the standard program has been resolved by a management processor 110. For example, the application processor 120 may load the executable code after receiving a signal from the management processors. The application processor 120 can then execute the executable version in accordance with the resolved symbolic constant at 304.

Figure 4:
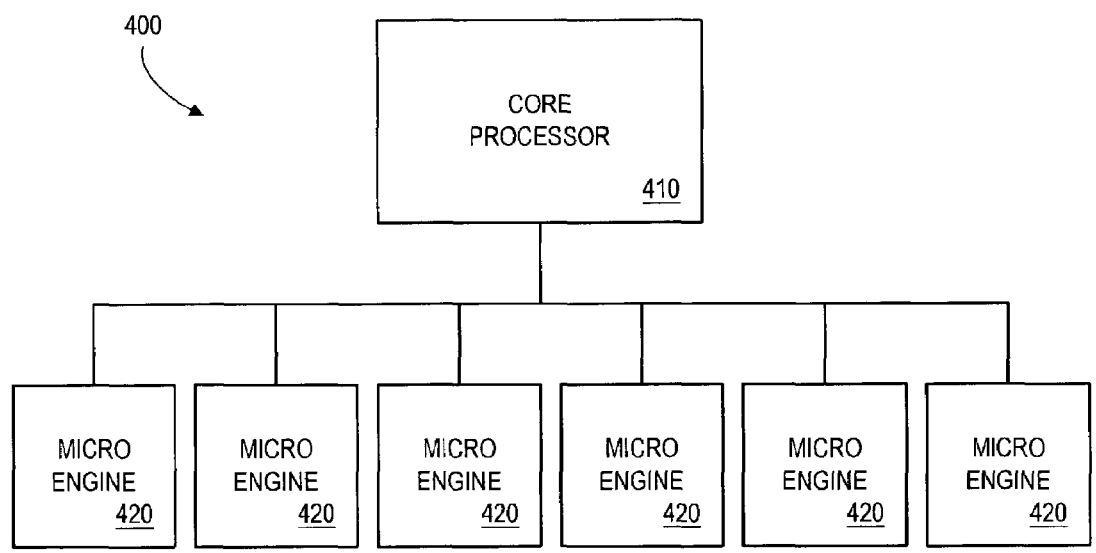
FIG. 4 is a block diagram of a network device according to some embodiments.
Figure 5:
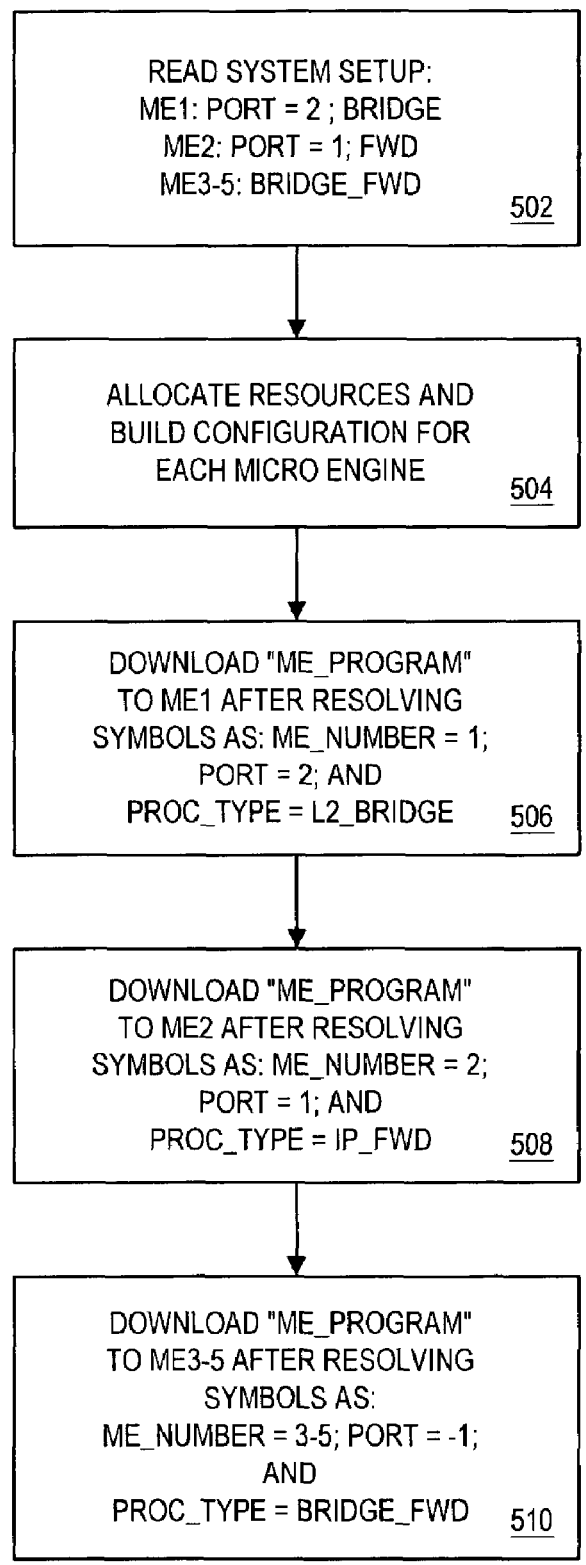
FIG. 5 is a flow chart of method that may be performed by a core processor according to some embodiments.

A specific example of a multi-processor system according to some embodiments will now be provided with respect to FIGS. 4 and 5.

EXAMPLE

FIG. 4 is a block diagram of a network device 400, such as a network bridge or router, according to some embodiments. As used herein, the term "network" may refer to, for example, a network associated with the Fast Ethernet LAN transmission standard 802.3-2002® published by the Institute of Electrical and Electronics Engineers (IEEE).

The network device 400 includes a core processor 410, such as an INTEL® strong ARM™ processor. The network device 400 also includes six micro engines 420, which may, for example, perform packet processing. That is, different micro engines 420 may be programmed to perform different tasks (e.g., tasks associated with the receipt, modification, and/or transmission of packets).

According to some embodiments, a standard program for the micro engines 420 is written by declaring configuration information as one or more import variables that are resolved at load time. The micro engine programs (i.e., instances of the standard program) can then use this information like any other symbolic constant. By way of example, consider the following "me_program" pseudocode:

```
{
    IMPORT_VAR      me_number;
    IMPORT_VAR      port;
    IMPORT_VAR      proc_type;
    #define L2_BRIDGE   1
    #define IP_FWD      2
    ...
    if (me_number = 1)
        do_something_for_me(1);
    else
        do_something_common( );
    ...
    read packet(port);
    if (proc_type = = L2_BRIDGE)
        bridge_packet( );
    else if (proc_type = = IP_FWD)
        fwd_packet( );
    else bridge_and_fwd( );
    ...
}
```

This program may then be compiled and linked to create an executable "me_program" for a particular micro engine 420. Note that the program includes both compile-time information (L2_BRIDGE and IP_FWD) and load-time configuration information (import variables me_number, port, and proc_type). Also note that the program is a generic program that may be downloaded to any of the micro engines 420. In this example, symbols that are not resolved receive a default value of zero.

Refer now to FIG. 5, which is a flow chart of method that may be performed by the core processor 410 according to some embodiments. When the core processor 410 application starts running, it reads the following system setup requirements (configuration information) at 502:

one micro engine 420 (ME1) will perform Layer 2 (L2) bridging on port 2;

another micro engine 420 (ME2) will perform Internet Packet (IP) forwarding on port 1;

three micro engines 420 (ME3 through ME5) will perform both L2 bridging and IP forwarding on other ports; and the final micro engine 420 (ME6) will not be used.

The system setup requirements may, for example, be defined by a user who specifies system-wide configuration information.

At 504, the core processor 410 allocates resources in accordance with these setup requirements. According to some embodiments, the core processor 410 then resolves the import variables in "me_program" to build the configuration for each micro engine 420. That is, the core processor 410 creates an instance of the "me_program" for each of the micro engines 420 by resolving (e.g., patching) the appropriate information. The programs may then be downloaded to, and executed by, the micro engines 420.

In particular, at 506 the core processor 410 resolves me_number to 1, port to 2, and proc_type to L2_BRIDGE for ME1. Similarly, at 508 the core processor 410 resolves me_number to 2, port to 1, and proc_type to IP_FWD for ME2. Finally, at 510 the core processor 410 resolves me_number to 3–5, port to –1, and proc_type to BRIDGE_FWD for ME3 through ME5 as appropriate.

Each micro engine 420 can then load the appropriate executable version (i.e., instance) of the "me_program" and execute that version in accordance with the resolved import variables.

Note that when the setup requirements change, the core processor 410 can rebuild the new configuration and repeat the process without changing the original "me_program." Consider, for example, a micro engine 420 that obtains data from a certain port number. The port number is declared in "me_program" as an import variable that is resolved at load time. If the port number needs to be changed, the port number can simply be resolved to the new value at load time. That is, depending on the setup requirements, "me_program" can behave differently in different instances on different micro engines 420.

Thus, the micro engines 420 can process information in a cooperative fashion without needing to retrieve the configuration information from memory. Moreover, "me_program" is flexible since it does not assume hard-coded values (i.e., compile-time constants) for the configuration information. Such an approach may improve the re-usability of multi-processor system programs without sacrificing efficiency or wasting resources (e.g., registers).

ADDITIONAL EMBODIMENTS

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Although some embodiments have been described with respect to particular environments (e.g., a network device), embodiments may be implemented in any multi-processor system. Moreover, although embodiments have been described with respect to a single management processor 110, multiple management processors 110 might be present (e.g., each managing a sub-group of application processors 120).

Further, although software or hardware may have been described as performing particular functions, such functions could be performed using either software or hardware—or a combination of software and hardware (e.g., a medium may store instructions adapted to be executed by a processor to perform a method of facilitating operation of a multi-processor system via a resolved symbolic constant).

The several embodiments described herein are solely for the purpose of illustration. Persons skilled in the art will recognize from this description other embodiments may be practiced with modifications and alterations limited only by the claims.

What is claimed is:

1. A method, comprising:
   determining configuration information at a management processor of a multi-processor network router adapted to receive and transmit network packets;
   resolving at the management processor a symbolic constant in a standard program based on the configuration information; and
   arranging for another processor of the multi-processor network router to execute an executable version of the standard program in accordance with the resolved symbolic constant.

2. The method of claim 1, wherein the configuration information is associated with at least one of: (i) a location where a data structure is stored at the multi-processor network router, and (ii) a global state that describes how data will be processed.

3. The method of claim 1, wherein said determining is performed during an initialization process in accordance with information defined by a user.

4. The method of claim 1, wherein (i) said resolving comprises resolving the symbolic constant to a first value for a first processor and to a second value for a second processor and (ii) said arranging comprises arranging for the first processor to execute a first executable version of the standard program in accordance with the first value and for the second processor to execute a second executable version of the standard program in accordance with the second value.

5. The method of claim 1, wherein said resolving comprises resolving a plurality of symbolic constants.

6. The method of claim 1, wherein the symbolic constant is associated with at least one of: (i) an import variable, and (ii) a constant that is set when an application is loaded.

7. The method of claim 1, wherein the management processor is to provide control and management of an application and the other processor is to cooperatively perform application processing.

8. The method of claim 1, wherein the management processor begins execution before the other processor.

9. The method of claim 8, wherein the management processor allocates a relevant state before the other processor begins execution.

10. The method of claim 1, wherein the management processor comprises a master processor and the other processor comprises a slave processor.

11. The method of claim 1, wherein the management processor comprises a core processor in the network router and the other processor is associated with a micro engine in the network router.

12. A computer-readable medium storing instructions adapted to be executed by a processor to perform a method, said method comprising:
   determining configuration information at a management processor of a multi-processor network router adapted to receive and transmit network packets;
   resolving at the management processor a symbolic constant in a standard program based on the configuration information; and
   arranging for another processor of the network router to execute an executable version of the standard program in accordance with the resolved symbolic constant.

13. The medium of claim 12, wherein the configuration information is associated with at least one of: (i) a location where a data structure is stored, and (ii) a global state that describes how data will be processed.

14. A method, comprising:
   loading, at an application processor of a multi-processor network router adapted to receive and transmit network packets, an executable version of a standard program, wherein a symbolic constant in the standard program has been resolved by a management processor of the network router; and
   executing at the application processor the executable version in accordance with the resolved symbolic constant.

15. The method of claim 14, wherein the application processor comprises at least one of: (i) a slave processor, and (ii) a micro engine in the network router.

16. A computer-readable medium storing instructions adapted to be executed by a processor to perform a method, said method comprising:
   loading, at an application processor of a multi-processor network router adapted to receive and transmit network packets, an executable version of a standard program, wherein a symbolic constant in the standard program has been resolved by a management processor of the network router; and
   executing at the application processor the executable version in accordance with the resolved symbolic constant.

17. The medium of claim 16, wherein the application processor comprises at least one of: (i) a slave processor, and (ii) a micro engine in the network router.

18. An apparatus, comprising:
   a management processor, of a multi-processor network router adapted to receive and transmit network packets, to determine configuration information and to resolve a symbolic constant in a standard program based on the configuration information; and
   an application processor of the network router to load an executable version of the standard program and to execute the executable version in accordance with the resolved symbolic constant.

19. The apparatus of claim 18, wherein the configuration information is associated with at least one of: (i) a location where a data structure is stored, and (ii) a global state that describes how data will be processed.

20. A network device, comprising:
a core processor, of a multi-processor network router adapted to receive and transmit network packets, to determine configuration information and to resolve import variables in a standard program based on the configuration information, wherein said resolving comprises resolving the import variables; and
a plurality of micro engines, of the network router, each micro engine to load an executable version of the standard program and to execute the executable version in accordance with the resolved import variables.

21. The network device of claim 20, wherein the configuration information is associated with at least one of: (i) a location where a data structure is stored, and (ii) a global state that describes how data will be processed.

* * * * *